July 10, 1973 L. J. HANSEN 3,745,207
PROCESS FOR THE RECOVERY OF WASTE PICKLE LIQUOR
Filed Jan. 25, 1971 2 Sheets-Sheet 2

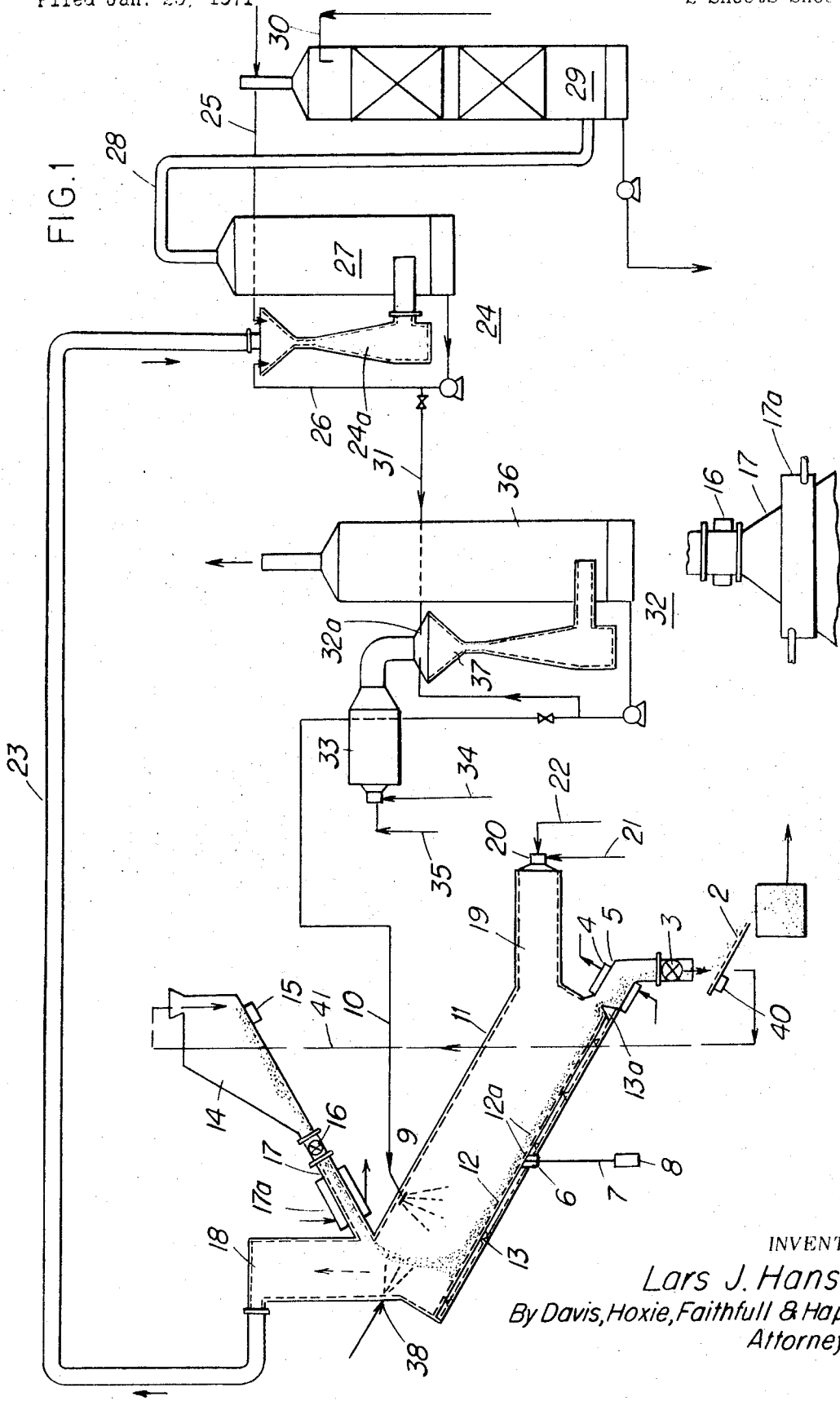

INVENTOR.
Lars J. Hansen
By Davis, Hoxie, Faithfull & Hapgood
Attorneys

United States Patent Office 3,745,207
Patented July 10, 1973

3,745,207
PROCESS FOR THE RECOVERY OF WASTE PICKLE LIQUOR
Lars J. Hansen, Wilmington, Del., assignor to Environmental Technology, Inc.
Continuation-in-part of application Ser. No. 99,223, Dec. 17, 1970, which is a continuation-in-part of application Ser. No. 838,511, July 2, 1969, both now abandoned. This application Jan. 25, 1971, Ser. No. 109,144
Int. Cl. C01g 49/02; C01b 17/48, 17/68
U.S. Cl. 423—154       13 Claims

ABSTRACT OF THE DISCLOSURE

Waste acid pickle liquor is converted into iron oxide and acid by depositing it on a compact moving bed and sweeping the bed with hot oxidizing gases.

---

This application is a continuation-in-part of my application Ser. No. 99,223, filed Dec. 17, 1970, which is in turn a continuation-in-part of my application Ser. No. 838,511, filed July 2, 1969, both applications are now abandoned.

Solutions of mineral acids, usually hydrochloric or sulfuric acid, are conventionally used to pickle iron. With time, the effectiveness of this pickling solution or pickle liquor decreases to the point where it is no longer useful and it must necessarily be disposed of or regenerated. At this point, it is referred to as "waste pickle liquor" and consists principally of an acid solution of an iron salt, e.g., iron chloride or sulphate, containing, typically, 15 to 25% iron (calculated as $FeCl_2$) and 0.5 to 2% free acid (calculated as HCl). It has become impractical to discharge the liquor into sewers or natural bodies of water because of its corrosive nature and the pollution which would result, quite apart from the loss of acid and ferrous values.

Waste pickle liquor can be regenerated by contacting it with hot oxidizing gases to evaporate water and acid gases and to convert the iron salt to oxide, for example according to the reactions:

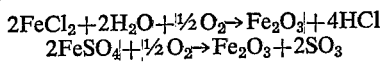

$$2FeCl_2 + 2H_2O + \tfrac{1}{2}O_2 \rightarrow Fe_2O_3 + 4HCl$$
$$2FeSO_4 + \tfrac{1}{2}O_2 \rightarrow Fe_2O_3 + 2SO_3$$

With sulfate liquor, $SO_2$ may also be formed.

In one class of conventional regeneration processes, the liquor is sprayed into a stream of hot oxidizing gases and evaporates and conversion takes place while the liquor particles are suspended in the gas. The iron oxide is produced as a very fine dust which is difficult to collect and handle, which cannot be used in blast furnaces or sintering plants and which is itself a source of air pollution requiring elaborate and expensive gas cleaning equipment. Moreover, because of the short residence time in the conversion zone, it is difficult to ensure complete conversion.

Alternatively, it has been proposed to carry out the conversions by spraying the waste liquor onto a bed of fluidized solids. This procedure also involves expensive gas separation apparatus, large quantities of gases at high pressures, and the use of a finely divided matrix from which the iron oxide is not easily separated.

In my prior applications referred to above, I have disclosed a process for treating waste pickle liquor in which the liquor is contacted with hot gases whilst flowing it over a compact bed of contact material, preferably alumina blocks. As the liquid components are evaporated, iron salts are deposited on the solids. Further contact with hot oxidizing gases converts the salts to oxide, which is formed as comparatively large nodules with a spongy structure. These characteristics make the oxide product particularly suitable for reuse in the iron-making process.

The nodules are removed from the bed by periodic agitation, either by poking or vibration or both.

While the process as described in my prior application has proved technically successful, it is essentially an intermittent operation and is difficult to scale up to industrial-size equipment. The alumina blocks which are the preferred contact material are also expensive.

In accordance with the present invention, these difficulties are overcome by means of a process in which waste pickle liquor is sprayed onto a moving mass of solid contact material. The contact material, having the waste liquor deposited or absorbed thereon, forms as a relatively shallow compact bed which is moved along a support whilst being swept by hot oxidizing gases to effect the desired evaporation and conversion.

The contact material is itself preferably a form of iron oxide. Mill scale, which is substantially $Fe_3O_4$, may be used as a start up material; subsequently the oxide product may be recycled in part, as contact material.

The term "compact bed" as used herein has the meaning usual in the process industries, i.e., a bed of discrete solid elements supported by one another, rather than by a percolating fluid, as in a fluidized bed.

The invention will be further described with reference to the accompanying drawing in which FIG. 1 is a schematic flow diagram of a system according to the invention, using hydrochloric acid as the waste liquor;

FIG. 2 is a schematic plan view of a part of the apparatus of FIG. 1;

Figure 3:
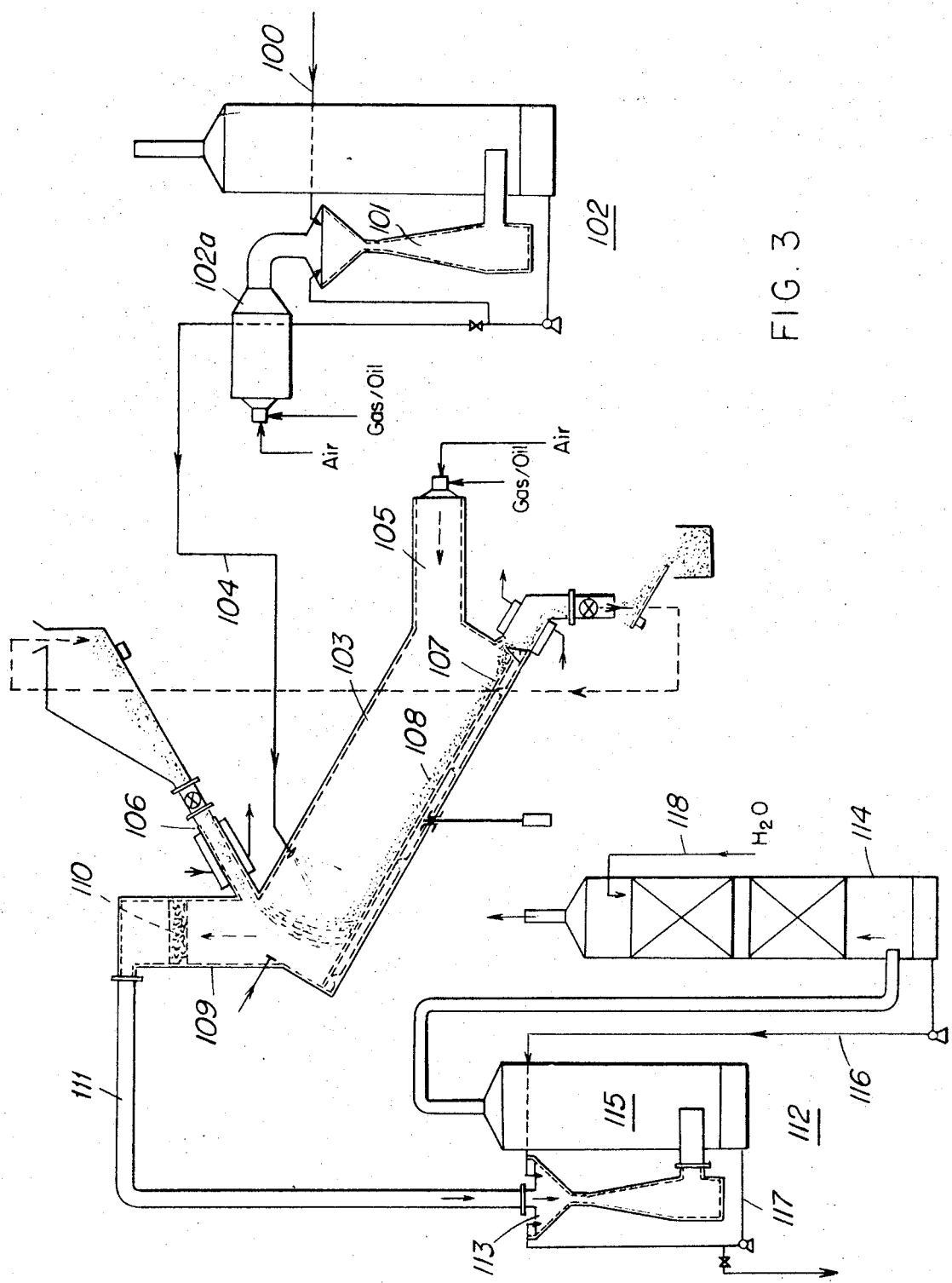
FIG. 3 is a schematic flow diagram of a modified system suitable for use with sulfuric acid liquor.

Referring to the drawing, FIGS. 1 and 2, waste acid pickle liquor, which has preferably been concentrated in a manner to be described, is delivered through a line 10 to a reactor 11. A nozzle 9 may be used to spray the liquor into the reactor. The reactor 11 is preferably an elongated chamber of rectangular cross section. It is mounted at an angle of 20° to 40° to the horizontal and means (not shown) may be provided for enabling this angle to be adjusted. On the lower surface of the reactor is mounted a refractory brick platform 12. This platform rests on supports 13 which are constructed of a high temperature wear-resistant material such as tungsten carbide, and which give the platform 12 a capability for movement, axially of the reactor, the movement being limited by a stop 13a. A vibrator 8 is suspended from the platform 12 by a shaft 7 and serves to vibrate the bed to facilitate movement of the material down the bed, and also to churn up the bed so that all particles are exposed on the surface to the same degree. The shaft 7 may be internally water-cooled and hinged as at 6 to accommodate changes in the inclination of the reactor 11.

At the bottom of the reactor is located a solids offtake duct 5 which is water-cooled by a sleeve 4. Duct 5, in turn, empties through airlock 3, located immediately below the airlock is a vibratory inclined screen 2, activated by vibrator 40.

A hopper 14 for contact material is provided above the reactor. A vibrator 15 is situated on the floor of the hopper to cause the hopper contents to move down through an airlock 16 into a conduit 17, water cooled by sleeve 17a, which empties into the upper end of reactor 11.

At the lower end of the reactor and emptying into the reactor is a burner tunnel 19. A burner 20 is located at the end of the tunnel 19. Fuel, such as gas or oil, is fed to burner 20 through line 21 and air through line 22.

The upper end of the reactor is provided with a gas offtake duct 18. Offtake duct 18 empties into line 23 which, in turn, delivers into the venturi section 24a of a venturi economizer 24. To the venturi 24a is also delivered fresh feed liquor via line 25 and economizer recycle liquor through line 26. The venturi discharges into a separation tank 27. The overhead gases from tank 27 are carried via line 28 to an absorber tower (normally a packed tower) 29. A line 30 is provided for furnishing water to the top of tower 29.

A line 31 is provided for transporting a portion of the economizer recycle liquor to the venturi section 32a of a venturi evaporator 32. Hot gases for the evaporator 32 are generated in a burner 33 which may be fed with fuel through line 34 and air through line 35. The venturi 32a discharges into a separation tank 36. Line 10 connects this tank with the reactor 11. A line 37 is provided for recycling a portion of the bottoms from tank 36 to the venturi 32a.

In operation, spent acid pickle liquor enters the system through line 25. In economizer venturi 24a it is immediately contacted with hot combustion gases drawn from the reactor 11. By this means it is heated and concentrated, for example from, say, 15% $FeCl_2$ to, say, 17–18% $FeCl_2$, and substantially all volatile free acid is eliminated. At the same time, the hot gases from the reactor are reduced in temperature so that refractory-lined conduits and the like are no longer required.

The concentrated liquor is then delivered through line 31 to evaporator venturi 32. Here it meets hot combustion gases at, say, 2000° F., and is concentrated to, say, 30–45% $FeCl_2$. It is then delivered through line 10 to reactor 11 via nozzle 9.

If the unit is just being started up, hopper 14 will be filled with a contact material from some external source such as mill scale, ground to an average particle size of, say, $\frac{1}{16}''-\frac{1}{8}''$. The contact material 14a is caused to move through airlock 16 into duct 17 by the action of vibrator 15. The duct 17, cooled by water sleeve 17a, is funnel-shaped, as indicated schematically in FIG. 2, so that the contact material leaving the duct 17 falls as a curtain across the width of the reactor 11 and builds up as a relatively shallow bed, say 1 to 3 inches thick, on the refractory brick platform 12. As it falls across the reactor, the contact material is contacted by liquor sprayed through nozzle 9 and by hot combustion gases entering the reactor 11 through burner tunnel 19. In the arrangement illustrated, the liquor is first contacted with hot gases so that a further concentration occurs and, at the time the liquor contacts the solid particles, it is in the nature of a thick syrup. The degree of concentration obtained at this point can be adjusted to some extent by varying the point at which the liquor is injected into the reactor. For example, an alternate position is indicated at 38. In any case, the liquor is picked up or absorbed by the solid particles of contact material and is carried by them as they fall to the platform 12 to form the bed 12a. Continued contact with the hot gases emanating from burner 20, which are at a temperature of, say, 800 to 1400° C., causes the further evaporation of water and free acid gases with the deposition of salt, typically $FeCl_2$ in and on the particles of contact material. Further contact with the oxygen-containing gases, as the solid contact material moves down the inclined reactor under the action of vibrator 8, converts the salts to oxides according to the reactions noted above. The stop 13a extends above the level of platform 12 and this causes the solids to dwell at this point and insures total conversion. Ultimately, the solids move over stop 13a and fall through offtake duct 5 which is kept cool by water sleeve 4, through airlock 3 and onto screen 2. The screen 2 is inclined and fitted with a vibrator 40. The coarser material moves off screen 2 into a storage bin 41, whence it may be delivered to a steel furnace or disposed of as desired. Smaller size material ($\frac{1}{16}''-\frac{1}{8}''$ and less) is recycled back to hopper 14 by a conveyor 41 where it serves as make-up contact material.

The overhead gases from the reactor, in the case of hydrochloric waste liquor, pass directly through duct 18, and line 23 to the economizer. These gases will consist chiefly of water, oxides of carbon, HCl, fixed gases and some oxygen. They will be at, say 600 to 700° C. In the economizer, their temperature is reduced to, say, 95 to 105° C. They are then carried through line 28 to absorber 29. Here they are contacted with water and substantially all the hydrochloric acid is absorbed, though additional scrubbing may be carried out if desired. The bottoms stream from absorber 29 contains on the order of 20% HCl and may be used directly for pickling.

A slightly modified system, shown in FIG. 3, is preferably used for processing sulfuric acid waste liquor. As will appear from FIG. 3, the raw liquor is first fed through a line 100 to the venturi section 101 of an evaporator 102 which is identical to the venturi evaporator 32 of FIG. 1. Here it is met with hot combustion gases from burner 102a and heated and concentrated. The concentrated liquor containing, say, 12 to 20% $FeSO_4$ and 8 to 10% free acid is then sent directly to reactor 103 via line 104. Reactor 103 is identical to reactor 11 in FIG. 1, and again the liquor is discharged into the reactor is contacted with hot combustion gases issuing from burner tunnel 105 and, after evaporation of water and acid gases, is picked up by particulate solid contact material falling in a curtain from duct 106, and is absorbed thereby. The contact material falls to platform 107 and forms a moving compact bed 108 thereon. Further evaporation occurs in the bed 108 with precipitation of iron sulphates and subsequent decomposition of the sulphates to pure iron oxide and $SO_2$ and $SO_3$. The latter gases pass through outlet duct 109. In the duct 109 is inserted a packed bed 110. This comprises packing material such as berl saddles upon which is deposited an oxidizing agent such as $V_2O_5$ capable of converting $SO_2$ in the gases to $SO_3$. The hot gases are then conveyed through line 111 to the venturi economizer 112. In the venturi section 113 of this economizer, the hot gases are contacted with sulfuric acid from a downstream absorber tower 114 and recycle liquor from the economizer tank 115 delivered through lines 116 and 117, respectively. By this means the hot gases are cooled and a certain portion of the $SO_3$ present therein is absorbed. The venturi section 113 discharges into a separator tank 115. Overhead gases from this tank are sent to the absorber tower 114 where they are contacted with water supplied through line 118 for final absorption of $SO_3$. Product $H_2SO_4$ is drawn as a bottoms stream of economizer separation tank 115.

It will be understood that various modifications may be made in the systems disclosed without departing from the invention. For example, although I prefer to use an iron oxide contact material because it avoids introduction of foreign elements into the system, other materials could be used if separation of the contact material and iron oxide was unnecessary or economically practicable.

Again, although the system specifically described uses a shallow bed and sweeps the oxidizing gases over the surface thereof, it is clear that a gas flow pattern can be used in which the gases pass through the bed, in which case a deeper bed might be used.

In any event, it will be clear that the process disclosed presents a simple, economical method for continuously converting waste acid pickle liquor into usable products. The iron oxide solids are of such size, shape and form that they are readily usable in the iron making process. The acid streams are suitable for reuse in pickling. The overhead stack gases are free from dust and acid gases and no liquid effluent is involved, thus avoiding water and air pollution with a minimum of expensive separating and clean-up equipment.

What is claimed is:

1. A method for converting waste acid pickle liquor containing iron salts which comprises depositing said liquor on a compact, inclined, moving bed of chemically inert, particulate, solid, contact material and contacting said bed containing said deposited liquor with a stream of hot oxidizing gases having a temperature between about 800° C. and about 1400° C. to effect evaporation of volatile components of said liquor and conversion of said iron salts to iron oxide.

2. The method claimed in claim 1 wherein the solid contact material is an iron oxide.

3. The method claimed in claim 2 wherein the material is mill scale.

4. The method claimed in claim 1 wherein the oxidizing gases comprise hot gaseous products of combustion.

5. A method of converting waste acid pickle liquor containing iron salts which comprises spraying said liquor through a stream of hot gases onto a shallow, compact, inclined, moving bed of solid, chemically inert, particulate, contact material, contacting said bed containing said liquor with hot oxidizing gases having a temperature between about 800° C. and about 1400° C. to evaporate volatile components from said liquor and to convert the iron salts to iron oxides and removing said contact material containing the oxide conversion products from said bed.

6. The method claimed in claim 5 wherein said contact material is essentially an iron oxide.

7. The method claimed in claim 5 and comprising removing hot volatile material from said bed and passing said volatile material in combination with hot oxidizing gases used to contact said bed, in direct contact with fresh pickle liquor to concentrate said liquor and cool said combined gases.

8. The method claimed in claim 7 and including contacting the cooled combined gases with water to absorb acid values thereupon.

9. The method claimed in claim 7 and comprising contacting the concentrated pickle liquor with hot combustion gases to further concentrate said liquor.

10. The method claimed in claim 5 wherein the liquor is sulfuric acid pickle liquor containing iron sulfates, and comprising removing volatile material containing sulfur dioxide from said bed and contacting said material with an oxidation catalyst to convert said sulfur dioxide to sulfur trioxide.

11. The method claimed in claim 5 and comprising removing volatile material containing acid gases from said bed and absorbing said acid gases in water to form an aqueous acid solution.

12. The method claimed in claim 11 and comprising concentrating said aqueous acid solution by contacting it with a mixture of hot volatile material removed from said bed and hot combustion gases used to contact said bed.

13. The method claimed in claim 5 wherein the bed is formed on an inclined support and caused to move by vibration of said support.

References Cited

UNITED STATES PATENTS

| | | | |
|---|---|---|---|
| 1,048,247 | 12/1912 | Weeks | 23—177 X |
| 2,021,867 | 11/1935 | Oliver et al. | 23—177 R |
| 2,155,119 | 4/1939 | Ebner | 23—1 R |
| 2,542,587 | 2/1951 | Smith | 23—288 |
| 3,195,981 | 7/1965 | Hansford et al. | 23—177 R |
| 3,440,009 | 4/1969 | Flood et al. | 23—200 X |

FOREIGN PATENTS 1,132,835   11/1968   England.

OSCAR R. VERTIZ, Primary Examiner

H. S. MILLER, Assistant Examiner

U.S. Cl. X.R.

423—533, 541